(12) United States Patent
Dai et al.

(10) Patent No.: US 9,190,911 B2
(45) Date of Patent: Nov. 17, 2015

(54) AUXILIARY RESONANT APPARATUS FOR LLC CONVERTERS

(71) Applicant: FutureWei Technologies, Inc., Plano, TX (US)

(72) Inventors: Heping Dai, Plano, TX (US); Hengchun Mao, Plano, TX (US); Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 164 days.

(21) Appl. No.: 13/786,266

(22) Filed: Mar. 5, 2013

(65) Prior Publication Data

US 2014/0254208 A1 Sep. 11, 2014

(51) Int. Cl.
*H02M 3/335* (2006.01)
*H02M 1/00* (2007.01)

(52) U.S. Cl.
CPC .......... *H02M 3/335* (2013.01); *H02M 3/33569* (2013.01); *H02M 2001/0058* (2013.01); *Y02B 70/1433* (2013.01); *Y02B 70/1491* (2013.01)

(58) Field of Classification Search
CPC ....................... H02M 3/335; H02M 2001/0058
USPC ......... 363/17, 21.02, 21.03, 98, 127
See application file for complete search history.

(56) References Cited

U.S. PATENT DOCUMENTS

| | | | |
|---|---|---|---|
| 5,388,040 A * | 2/1995 | Hall | 363/16 |
| 5,486,752 A * | 1/1996 | Hua et al. | 323/222 |
| 6,172,882 B1 * | 1/2001 | Tanaka et al. | 363/17 |
| 6,341,078 B1 * | 1/2002 | Miller | 363/98 |
| 6,344,979 B1 | 2/2002 | Huang et al. | |
| 6,587,359 B2 * | 7/2003 | Raets et al. | 363/24 |
| 6,995,987 B2 * | 2/2006 | Song et al. | 363/17 |
| 7,145,786 B2 | 12/2006 | Vinciarelli | |
| 7,196,914 B2 | 3/2007 | Ren et al. | |
| 7,692,937 B2 * | 4/2010 | Zeng et al. | 363/17 |
| 7,742,318 B2 | 6/2010 | Fu et al. | |
| 7,869,237 B1 * | 1/2011 | Schutten et al. | 363/132 |
| 8,040,697 B2 * | 10/2011 | Zhou et al. | 363/21.02 |
| 8,149,599 B2 * | 4/2012 | Coccia et al. | 363/21.02 |
| 8,363,427 B2 * | 1/2013 | Anguelov et al. | 363/21.02 |
| 2005/0270812 A1 * | 12/2005 | Vinciarelli | 363/65 |
| 2009/0097280 A1 * | 4/2009 | Wu et al. | 363/17 |
| 2011/0103098 A1 * | 5/2011 | Wu et al. | 363/17 |
| 2013/0121033 A1 * | 5/2013 | Lehn et al. | 363/17 |
| 2013/0194831 A1 * | 8/2013 | Hu | 363/21.01 |
| 2013/0265804 A1 * | 10/2013 | Fu et al. | 363/17 |

(Continued)

OTHER PUBLICATIONS

Severns, R. P., "Topologies for Three-Element Resonant Converters," IEEE Transactions on Power Electronics, vol. 7, No. 1, Jan. 1992, pp. 89-98.

(Continued)

*Primary Examiner* — Gary L Laxton
*Assistant Examiner* — Kyle J Moody
(74) *Attorney, Agent, or Firm* — Slater & Matsil, L.L.P.

(57) ABSTRACT

A resonant tank comprises a series resonant inductor coupled to a switching network and a transformer, a series resonant capacitor coupled to the switching network and the transformer, a first parallel inductor implemented as a magnetizing inductance of the transformer, a second parallel inductor implement as a separate inductor, wherein a first inductance of the first parallel inductor is greater than a second inductance of the second parallel inductor and a switch connected in series with the second parallel inductor.

18 Claims, 12 Drawing Sheets

(56) References Cited

U.S. PATENT DOCUMENTS

2014/0254203 A1* 9/2014 Dai et al. .................. 363/17
2015/0028886 A1* 1/2015 Rekers .................... 324/551

OTHER PUBLICATIONS

Chakraborty, C., et al., "Performance, Design and Pulse Width Control of a CLL Resonant DC/DC Converter Operating at Constant Frequency in the Lagging Power Factor Mode," Department of Electrical & Electronics Engineering, IEEE 1999 International Conference on Power Electronics and Drive Systems, PEDS'99, Hong Kong, Jul. 1999, pp. 767-772.

Kim, E. S., et al., "A Novel Topology of Secondary LLC Series Resonant Converter," Applied Power Electronics Conference, APEC 2007—Twenty Second Annual IEEE, 2007, pp. 1625-1629.

Huang, D., et al., "High-Frequency High-Efficiency *CLL* Resonant Converters With Synchronous Rectifiers," Industrial Electronics, IEEE Transactions on, vol. 58, Issue 8, Aug. 2011, pp. 3461-3470.

* cited by examiner

AUXILIARY RESONANT APPARATUS FOR LLC CONVERTERS

TECHNICAL FIELD

The present invention relates to resonant converters, and more particularly, to a full bridge inductor-inductor-capacitor (LLC) resonant converters.

BACKGROUND

A telecommunication network power system usually includes an AC-DC stage converting the power from the AC utility line to a 48V DC distribution bus and a DC-DC stage converting the 48V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters and the like. As known in the art, bridge converters generally are employed when the power of a DC-DC converter is more than 100 watts.

FIG. 1 (prior art) illustrates a conventional full bridge converter having a full wave rectifier coupled to a center-tapped secondary winding. The full bridge converter 100 includes four switches Q1, Q2, Q3 and Q4 at a primary side of a transformer Tx. The four switches Q1, Q2, Q3 and Q4 form a bridge having two legs. Q1 and Q3 in series connection have a common node, referred to as A. Q2 and Q4 in series connection have a common node, referred to as B. The primary winding of the transformer Tx is connected to A and B. A dc supply Vin is connected to the two legs to provide power to the full bridge converter 100.

According to the operating principle of a hard switching full bridge converter, the switches Q1 and Q4 are turned on simultaneously for an adjustable time during a first half cycle. After a period of dead time, the switches Q2 and Q3 are turned on simultaneously for an equal time during the second half cycle. As a result, Vin and −Vin are applied to the primary side of the transformer Tx in alternate half periods.

In a fixed duty cycle control scheme, the turn-on time of the switches Q1 and Q4 is equal to the turn-on time of the switches Q2 and Q3. When all four switches are turned off, both S1 and S2 are turned on. The load current flows through S1 and S2. This interval is referred to as a freewheeling period. The output voltage of the bridge converter 100 is proportional to the turn-on time of the switches. A controller (not shown) may detect the output voltage Vo and adjust the turn-on time via a negative feedback control loop (not shown).

The secondary side of the transformer Tx is center-tapped. Such a center-tapped secondary and two switches S1 and S2 can form a full wave rectifier, which can convert the primary voltage having double polarities (Vin and −Vin) of the transformer Tx to a secondary voltage having a single polarity. Then, the secondary voltage having a single polarity is fed to an output filter including an inductor Lo and an output capacitor Co. The output filter averages the square voltage pulses at the output of the full wave rectifier and generates a DC voltage at Vo, which is then supplied to a load represented by a resistor $R_L$.

A phase shift full bridge converter is capable of reducing switching losses by means of the zero voltage switching control technique. As shown in a dashed rectangle 120 of FIG. 1, instead of turning on two primary switches (e.g., Q1 and Q4) simultaneously, the turn-on time of these two switches are shifted by a period of time. More particularly, as depicted in the dashed rectangle 120, a waveform 106 and a waveform 110 show Q1 is on for a period of time before Q4 is turned on. There is an overlap between Q1's turn-on time and Q4's turn-on time. After Q1 is turned off, Q4 stays on for a period of time. Likewise, a waveform 107 and a waveform 111 show there is a phase shift between Q2 and Q3's turn-on time.

The phase shift full bridge can achieve zero voltage switching by utilizing the L-C resonance between transformer leakage inductance and MOSFET (e.g., Q1) output capacitance. For example, Q3 has a parasitic capacitor (not shown) across its drain and source. During the period when both Q1 and Q4 are on, the voltage across Q3's parasitic capacitor is charged to a voltage approximately equal to Vin. According to the basic principle of the phase shift control technique, Q1 is off prior to Q4. After Q1 is off, the primary side current cannot change instantaneously. As a result, the primary side current will flow through the parasitic capacitors of Q1 and Q3. The flow of the primary side current through both parasitic capacitors may cause the voltage at the junction between Q1 and Q3 to be discharged to zero, enabling zero voltage switching when Q3 is turned on without substantial power losses. Similarly, the phase shift operation may enable a lossless turn-on process of other switches, namely Q1, Q2 and Q4.

SUMMARY OF THE INVENTION

These and other problems are generally solved or circumvented, and technical advantages are generally achieved, by preferred embodiments of the present invention which provide a system, apparatus and method for improving efficiency of an inductor-inductor-capacitor (LLC) resonant converter.

In accordance with an embodiment, an apparatus comprises a series resonant inductor coupled to a switching network and a transformer, a series resonant capacitor coupled to the switching network and the transformer, a first parallel inductor implemented as a magnetizing inductance of the transformer, a second parallel inductor implement as a separate inductor, wherein a first inductance of the first parallel inductor is greater than a second inductance of the second parallel inductor and a switch connected in series with the second parallel inductor.

In accordance with an embodiment, a system comprises an input power source, a switching network comprising a first pair of switches coupled between the input power source and a second pair of switches coupled between the input power source, a resonant tank connected between the switching network and a primary side of a transformer, a rectifier coupled to a secondary side of the transformer and an output filter coupled to the rectifier.

The resonant tank comprises a resonant inductor coupled to the switching network and the transformer, a resonant capacitor coupled to the switching network and the transformer, a first parallel inductor implemented as a magnetizing inductance of the transformer, a second parallel inductor implement as a separate inductor, wherein a first inductance of the first parallel inductor is greater than a second inductance of the second parallel inductor and a switch connected in series with the second parallel inductor.

In accordance with another embodiment, a method comprises providing a resonant tank coupled between a switching network and a transformer, wherein the resonant tank comprises a series inductor, a series capacitor connected in series with the series inductor and a parallel inductor connected in series with a switch, wherein a magnetizing inductance of the transformer is greater than an inductance of the parallel inductor.

The method further comprises configuring the switching network to operate at a switching frequency approximately equal to a resonant frequency of the resonant tank, prior to a zero voltage transition, during a dead time turning on the switch and after the zero voltage transition, turning off the switch.

An advantage of a preferred embodiment of the present invention is reducing the switching losses of an LLC resonant converter so as to improve the LLC resonant converter's efficiency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a full bridge inductor-inductor-capacitor (LLC) resonant converter including an auxiliary resonant apparatus. The invention may also be applied, however, to a variety of converters including half bridge LLC resonant converters, push-pull LLC resonant converters and the like.

Figure 1:
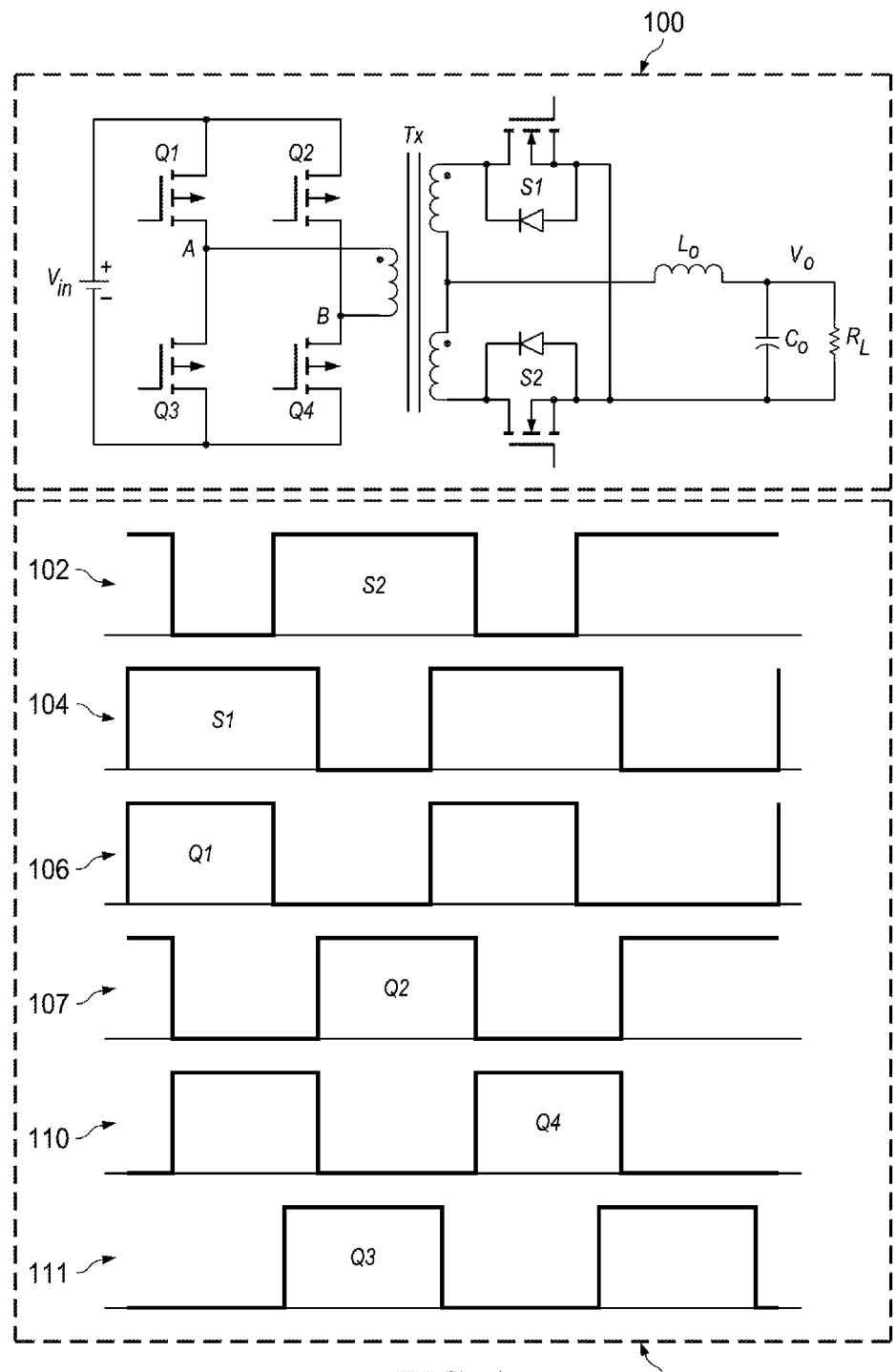
FIG. 1 illustrates a full bridge converter having a full wave rectifier coupled to a center-tapped secondary winding.
Figure 2:
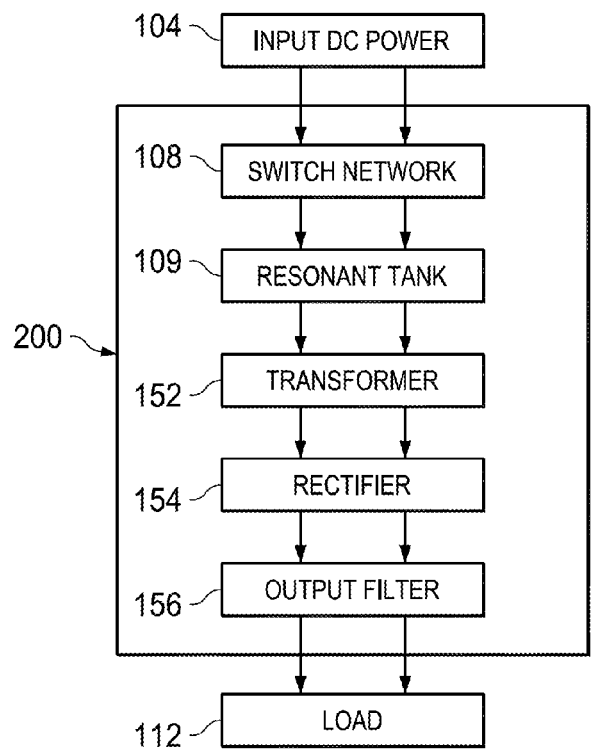
FIG. 2 illustrates a block diagram of an LLC resonant converter in accordance with various embodiments of the present disclosure.

FIG. 2 illustrates a block diagram of an LLC resonant converter in accordance with various embodiments of the present disclosure. The LLC resonant converter 200 is coupled between an input dc power source 104 and a load 112. The input dc power source 104 may be telecommunication power supplies converting a utility line voltage to a dc voltage. Alternatively, the input dc power source 104 may be a solar panel array. Furthermore, the input dc power source 104 may be an energy storage device such as rechargeable batteries, fuel cells and/or the like. The load 112 represents the power consumed by a circuit coupled to the LLC resonant converter 200. Alternatively, the load 112 may refer to downstream converters coupled to the output of the LLC resonant converter 200.

The LLC resonant converter 200 may comprise a switch network 108, a resonant tank 109, a transformer 152, a rectifier 154 and an output filter 156. As shown in FIG. 2, the switch network 108, the resonant tank 109, the transformer 152, the rectifier 154 and the output filter 156 are coupled to each other and connected in cascade between the input dc power source 104 and the load 112.

The switch network 108 may comprise primary side switches of a full bridge resonant converter according to some embodiments. Alternatively, the switch network 108 may be of the primary side switches of other bridge converters such as a half-bridge resonant converter, a push-pull resonant converter and the like. The detailed configuration of the switch network 108 will be described below with respect to FIG. 5.

The resonant tank 109 may be implemented in a variety of ways. For example, the resonant tank 109 may comprise a main resonant tank and an auxiliary resonant apparatus. The main resonant tank comprises a first series resonant inductor and a first series resonant capacitor. The auxiliary resonant apparatus comprises a parallel inductor, a switch and various drain-to-source capacitances of the primary side switches. The parallel inductor and the switch are connected in series to form a series inductor-switch circuit. Throughout the description, the auxiliary resonant apparatus is alternatively referred to as the auxiliary resonant tank.

The first series resonant inductor and the parallel resonant inductor may be implemented as external inductors. The configuration of the resonant tank 109 described above is merely an example. There may be many variation, alternatives and modifications. For example, the first series resonant inductor may be implemented as a leakage inductance of the transformer 152.

The resonant tank 109 described above includes two inductors and a capacitor. In addition, the magnetizing inductance of the transformer 152 may be part of the resonant tank 109 in a conventional definition of the resonant tank of an LLC resonant converter. According to some embodiments, the magnetizing inductance of the transformer 152 is greater than the inductance of the parallel resonant inductor. As a result, the parallel resonant inductor is a dominant factor of the resonant tank 109. The relationship between the parallel inductor and the magnetizing inductance in a resonant process will be described in detail below with respect to FIG. 3 and FIG. 5.

In sum, the resonant tank 109 includes three key resonant elements, namely the first series resonant inductor, the first series resonant capacitor and the parallel resonant inductor. Such a configuration is commonly referred to as an LLC resonant converter. According to the operating principle of LLC resonant converters, at a switching frequency approximately equal to the resonant frequency of the resonant tank 109, the resonant tank 109 helps to achieve zero voltage switching for the primary side switching elements and zero current switching for the secondary side switching elements.

The LLC resonant converter 200 may further comprise a transformer 152, a rectifier 154 and an output filter 156. The transformer 152 provides electrical isolation between the primary side and the secondary side of the LLC resonant converter 200. In accordance with an embodiment, the transformer 152 may be formed of two transformer windings, namely a primary transformer winding and a secondary transformer winding. Alternatively, the transformer 152 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 154 converts an alternating polarity waveform received from the output of the transformer 152 to a single polarity waveform. When the transformer 152 is of a center tapped secondary, the rectifier 154 may be formed of a pair of switching elements such as n-type metal oxide semiconductor (NMOS) transistors. Alternatively, the rectifier 154 may be formed of a pair of diodes. On the other hand, when the transformer is of a single secondary winding, the rectifier 154 may be a full-wave rectifier coupled to the single secondary winding of the transformer 152.

Furthermore, the rectifier 154 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 154 are well known in the art, and hence are not discussed herein.

The output filter 156 is used to attenuate the switching ripple of the LLC resonant converter 200. According to the operation principles of isolated dc/dc converters, the output filter 156 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 156 are within various embodiments of the present disclosure.

Figure 3:
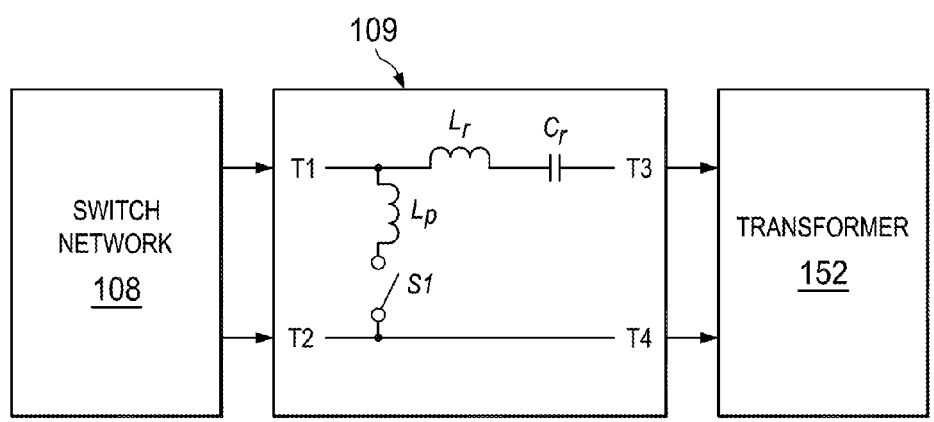
FIG. 3 illustrates a schematic diagram of the resonant tank shown in FIG. 2 in accordance with various embodiments of the present disclosure.

FIG. 3 illustrates a schematic diagram of the resonant tank shown in FIG. 2 in accordance with various embodiments of the present disclosure. The resonant tank 109 comprises four terminals, namely T1, T2, T3 and T4. There may be a resonant inductor Lr connected in series with a resonant capacitor Cr. The series connected Lr and Cr may be coupled between the terminals T1 and T3.

In addition, there may be a parallel inductor Lp connected in series with a switch S1. As shown in FIG. 3, the parallel inductor Lp and the switch S1 form a series inductor-switch circuit, which is coupled between the terminals T1 and T2. In some embodiments, the switch S1 may be implemented as two back-to-back switching elements. For example, each switching element may be a metal oxide semiconductor transistor.

It should be noted that the resonant inductor Lr and the resonant capacitor Cr are similar to the resonant inductors and capacitors employed in conventional LLC converters. The parallel inductor Lp is used to replace the magnetizing inductance of the transformer 152 during an L-C resonant process. In other words, the magnetizing inductance of the transformer 152 is not a dominant element of the resonant process of the LLC resonant converter. As a result, the design of the magnetizing inductance may be simplified. For example, the magnetizing gap of the transformer 152 can be omitted while maintaining zero switching such as a zero voltage transition of the primary side switches and a zero current transition of the secondary side switches.

It should be noted that while FIG. 3 illustrates a parallel inductor connected in series with a switch, various embodiments of the present disclosure may include a capacitor connected in series with the parallel inductor and the switch. The capacitor may be of a capacitance greater than the drain-to-source capacitances of the primary side switches.

The parallel inductor and the switch form an alternative current path. The current flowing through the alternative current path is alternatively referred to as the alternative path current throughout the description.

It should further be noted that by employing the switch S1, an auxiliary path current may flow through the series inductor-switch circuit only in a short period prior to a zero voltage transition. The detailed control mechanism of the switch S1 will be described below with respect to FIG. 6A and FIG. 6B.

Figure 4:
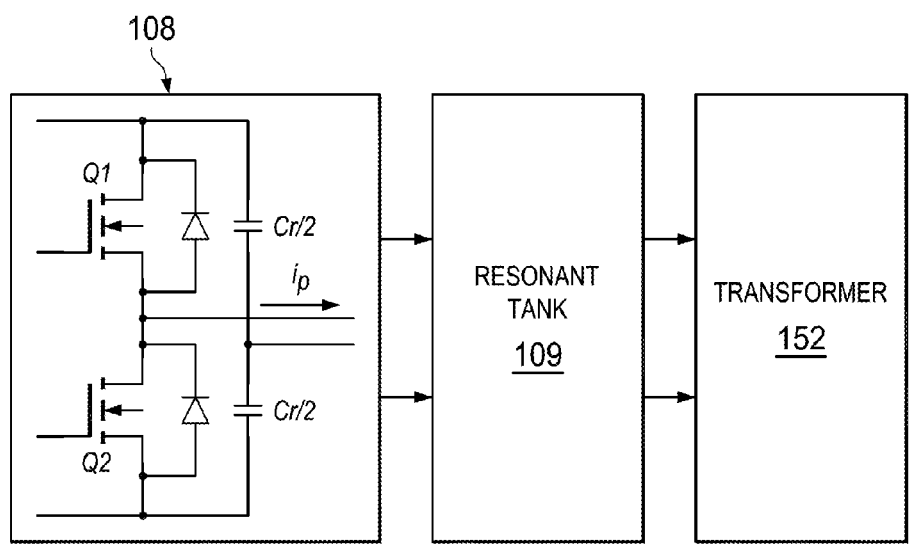
FIG. 4 illustrates another configuration of the resonant tank shown in FIG. 2 in accordance with various embodiments of the present disclosure.

FIG. 4 illustrates another configuration of the resonant tank shown in FIG. 2 in accordance with various embodiments of the present disclosure. The switching network 108 may be formed of a variety of power converter topologies such as full bridge converters, half bridge converters, push-pull converters and/or the like. In addition, some elements of the resonant tank 109 may be moved into the switching networks 108. For example, as shown in FIG. 4, the resonant capacitor Cr shown in FIG. 3 may be replaced by two capacitors of a half bridge converter. The series connected capacitors of a half bridge converter may function as a resonant capacitor, which is coupled to the resonant inductor Lr (shown in FIG. 3) to achieve a zero voltage transition for primary side switches and a zero current transition for secondary side switches.

Figure 5:
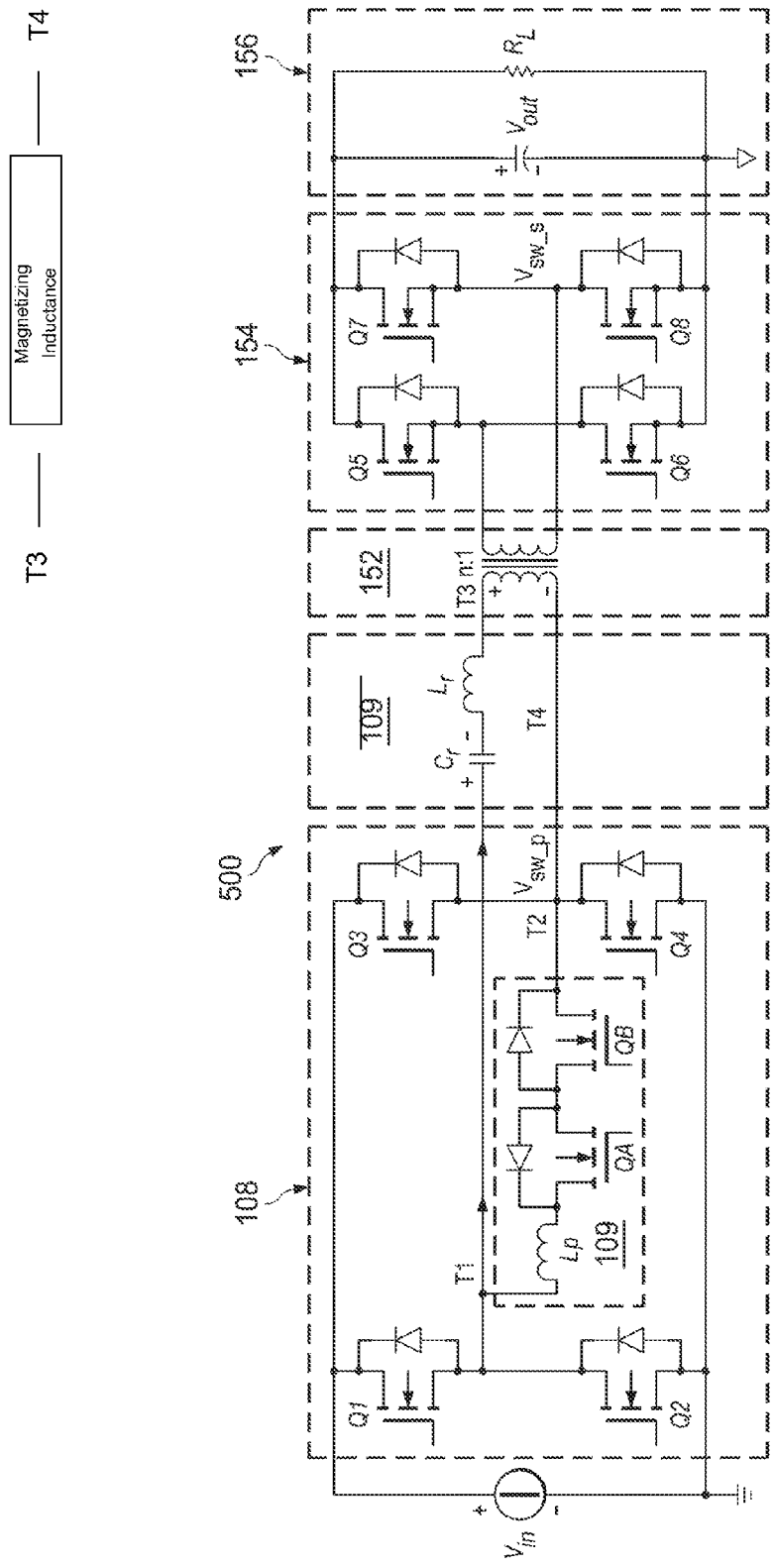
FIG. 5 illustrates a schematic diagram of the LLC resonant converter shown in FIG. 2 in accordance with various embodiments of the present disclosure.

FIG. 5 illustrates a schematic diagram of the LLC resonant converter shown in FIG. 2 in accordance with various embodiments of the present disclosure. The switch network 108 includes four switching elements, namely Q1, Q2, Q3 and Q4. As shown in FIG. 5, a first pair of switching elements Q1 and Q2 are connected in series. A second pair of switching elements Q3 and Q4 are connected in series. The common node of the switching elements Q1 and Q2 is coupled to a first input terminal T1 of the resonant tank 109. Likewise, the common node of the switching elements Q3 and Q4 is coupled to a second input terminal T2 of the resonant tank 109.

The switching elements Q1, Q2, Q3 and Q4 form a primary side switching network of a full bridge converter. According to some embodiments, switching elements Q1, Q2, Q3 and Q4 are implemented as MOSFET or MOSFETs connected in parallel.

According to alternative embodiments, the primary switches (e.g., switch Q1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like. The detailed operation principles of the switch network 108 will be described below with respect to FIG. 6A and FIG. 6B.

It should be noted that while the example throughout the description is based upon a full bridge LLC resonant converter (e.g., full bridge LLC resonant converter shown in FIG. 5), the LLC resonant converter 200 shown in FIG. 2 may have many variations, alternatives, and modifications. For example, half bridge converters, push-pull converters may be alternatively employed. The full bridge resonant converter illustrated herein is limited solely for the purpose of clearly illustrating the inventive aspects of the various embodiments. The present invention is not limited to any particular power topology.

It should further be noted that while FIG. 5 illustrates four switches Q1, Q2, Q3, and Q4, various embodiments of the present disclosure may include other variations, modifications and alternatives. For example, a separate capacitor may be connected in parallel with each switch of the primary side switching network. Such a separate capacitor helps to better control the timing of the resonant process of the LLC resonant converter 500.

FIG. 5 shows that the resonant tank 109 is formed by the resonant inductor Lr, the resonant capacitor Cr, the parallel inductance Lp and two back-to-back connected metal oxide semiconductor transistors $Q_A$ and $Q_B$. As shown in FIG. 5, the resonant inductor Lr and the resonant capacitor Cr are connected in series and further coupled to one terminal of the primary side of the transformer 152. The parallel inductance Lp, transistors $Q_A$ and $Q_B$ form a series inductor-transistor circuit, which is connected between the first input terminal T1 and the second input terminal T2 of the resonant tank 109 and further coupled to the common node of Q1 and Q2, and the common node of Q3 and Q4.

In order to ensure that the parallel inductor Lp replaces the magnetizing inductance Lm of the transformer 152 during a resonant process, the magnetic inductance Lm is of an inductance value greater than the parallel inductor Lp. The greater inductance value of the magnetizing inductor keeps the magnetizing current flowing into the magnetizing inductance Lm smaller than the auxiliary path current flowing into a low impedance path provided by the parallel inductor Lp. In some embodiments, the inductance of the parallel inductor Lp may be less than 1 uH. The magnetizing inductance is at least ten times greater than the parallel inductance.

The parallel inductance Lp may be utilized in combination with Lr and Cr to achieve zero voltage switching for the primary side switching elements (e.g., Q1) and zero current switching for the secondary side switching elements (e.g., Q8). One advantageous feature of the LLC resonant converter 500 shown in FIG. 5 is that the LLC resonant converter 500 may operate at a frequency close to the resonant frequency of the resonant tank 109. As such, the LLC resonant converter 500 can achieve zero voltage switching for the primary side switches and zero current switching for the secondary side switches. The soft switching operation of the primary and secondary switches helps to achieve high efficiency.

It should be noted while FIG. 5 shows the resonant inductor Lr is an independent component, the resonant inductor Lr may be replaced by the leakage inductance of the transformer 152. In other words, the leakage inductance (not shown) may be utilized as part of the resonant inductor Lr.

The transformer 152 may be of a primary winding and a secondary winding. The primary winding is coupled to terminals T3 and T4 of the resonant tank 109 as shown in FIG. 5. The secondary winding is coupled to the load 112 through a full-wave rectifier 154. It should be noted the transformer structure shown in FIG. 5 is merely an example. One person skilled in the art will recognize many alternatives, variations and modification. For example, the transformer 152 may be a center tapped transformer coupled between the primary side switching network and the second side switching network. The secondary side employs a synchronous rectifier formed by two switching elements. The operation principle of a synchronous rectifier coupled to a center tapped transformer secondary side is well known, and hence is not discussed in further detail herein.

It should be noted that the power topology of the LLC resonant converter 500 may be not only applied to a full-wave rectifier as shown in FIG. 5, but also applied to other secondary configurations, such as voltage doubler rectifiers, current doubler rectifiers and/or the like.

Figure 6A:
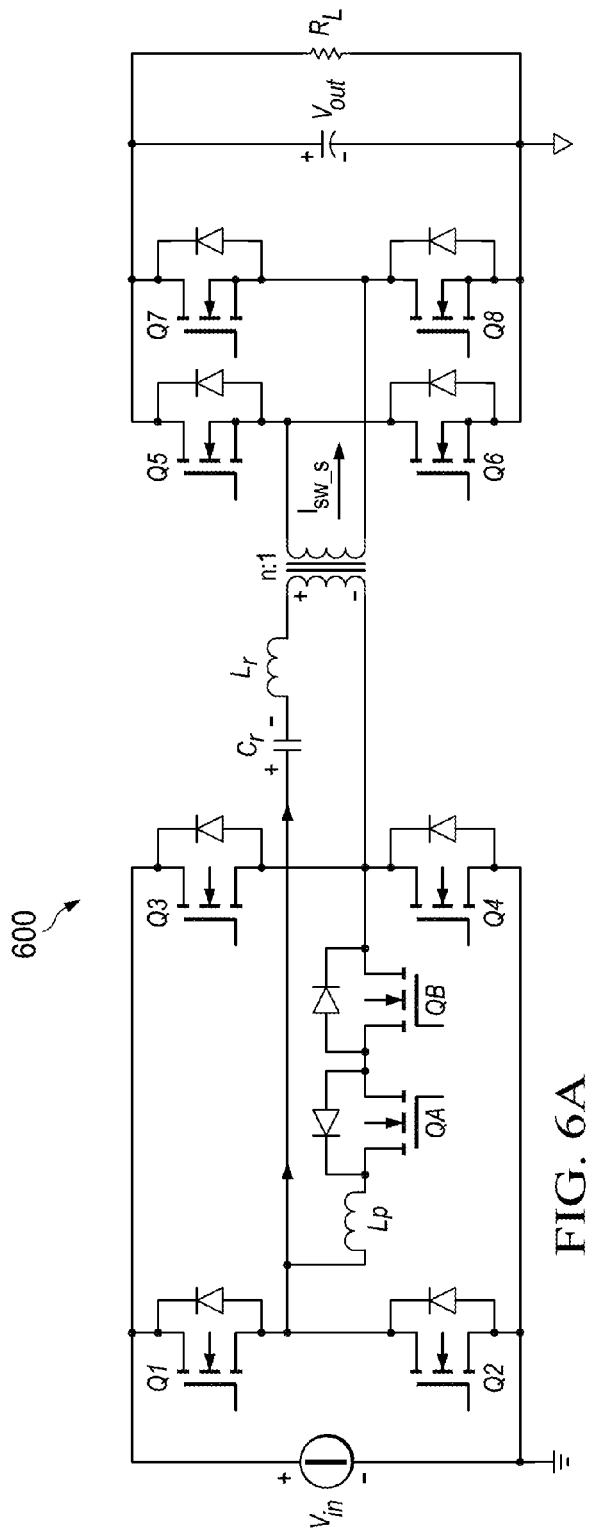
FIG. 6A and FIG. 6B illustrate key switching waveforms of the LLC resonant converter shown in FIG. 5 in accordance with various embodiments of the present disclosure.
Figure 6B:
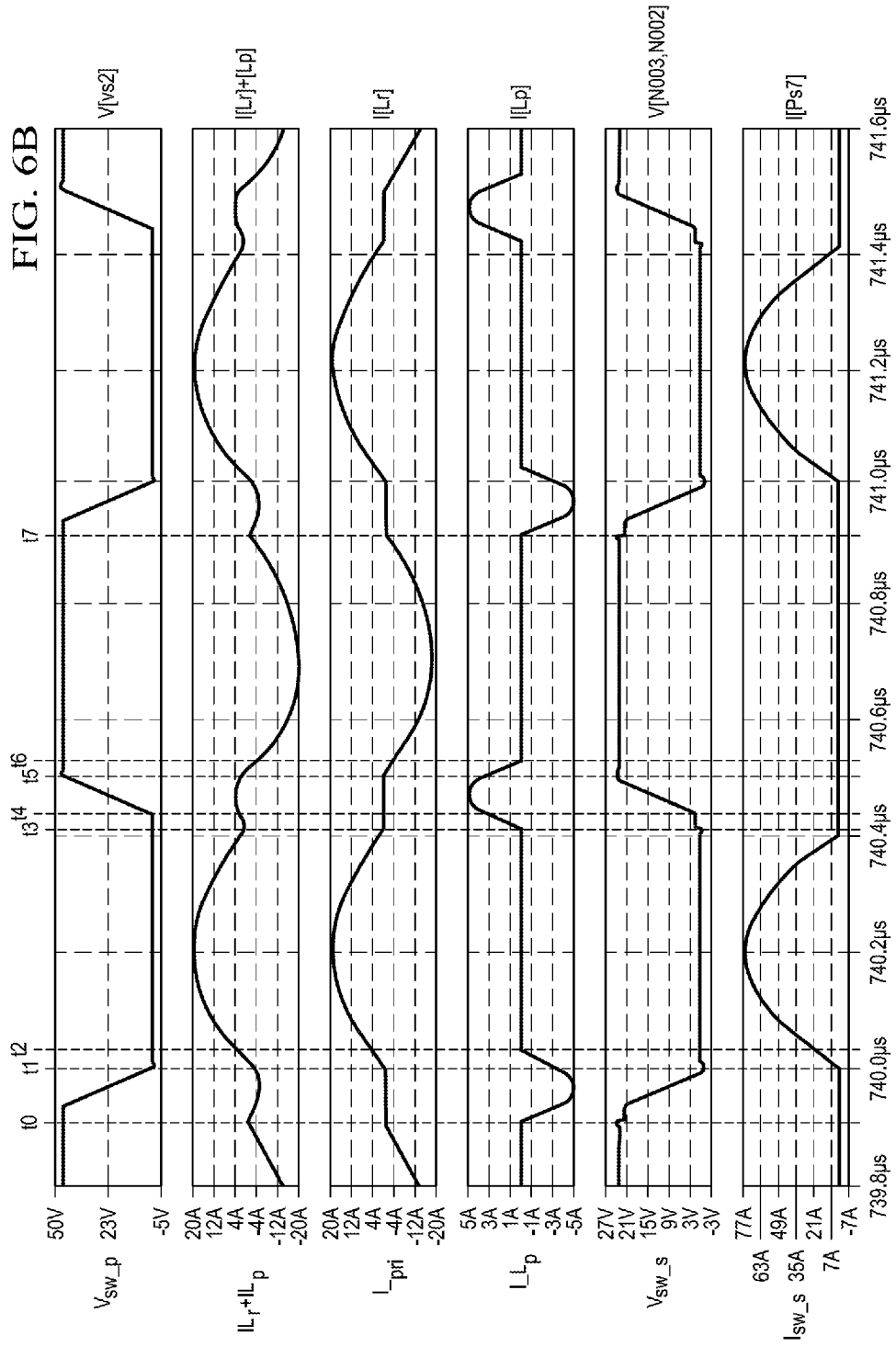

FIG. 6A and FIG. 6B illustrate key switching waveforms of the LLC resonant converter shown in FIG. 5 in accordance with various embodiments of the present disclosure. In order to better illustrate zero voltage switching of the primary side switches and zero current switching of the secondary switches, the drain-to-source voltages of Q4 and Q8 are selected to illustrate the operation principle of the LLC resonant converter 600. As shown in FIG. 6A, the drain-to-source voltage of the primary side switch Q4 is referred to as $V_{SW\_P}$. Likewise, the drain-to-source voltage of the secondary side switch Q8 is referred to as $V_{SW\_S}$.

During one switching period, Q1 and Q4 may be turned on at the same time. The turned on Q1 and Q4, and the resonant tank and the primary side of the transformer winding form a conductive path through which the input voltage source Vin delivers energy from the primary side to the secondary side of the transformer through the turned on Q5 and Q8. It should be noted that in order to further improve the efficiency of the resonant tank, the auxiliary path current only flows into the parallel inductor Lp in a short period (e.g., interval from t3 to t6 as shown in FIG. 6B).

On the other hand, once Q1 and Q4 are turned off, Q2 and Q3 may be turned on at the same time after a short delay time. The turned on Q2 and Q3, the resonant tank and the primary side of the transformer winding form another conductive path through which the input voltage source Vin delivers energy to the secondary side through turned on Q6 and Q7. It should further be noted that the parallel inductor Lp may be reset within a short period as shown in FIG. 6B.

A switching period is selected to further illustrate the operation principle of the LLC resonant converter 600. The switching period may start from t0 and stop at t7 as shown in FIG. 6B. Prior to t0, Q2 and Q3 are on. A controller (not shown) turns on $Q_B$ at t0 to prepare a zero voltage transition. Through a conductive path formed by Q3, $Q_B$, the body diode of $Q_A$ and Q2, the input voltage source Vin starts to charge the parallel inductor Lp.

It should be noted that the turn-on starting point of $Q_B$ is selected based upon different design needs and applications.

In other words, the turn-on starting point of $Q_B$ is adjustable. For example, $Q_B$ may be turned on earlier in order to have a larger auxiliary path current for a subsequent zero voltage transition process. In some applications, the switches (e.g., Q4) may be of a large drain-to-source capacitance. In order to fully discharge the drain-to-source voltage of Q4 within a short dead time, a larger auxiliary path current is required.

One advantageous feature of having an adjustable turn-on starting point of the switches (e.g., $Q_A$ and $Q_B$) is that under a switching frequency not equal to the resonant frequency of the resonant tank, the LLC resonant converter 600 may achieve zero voltage switching of the primary side switches and zero current switching of the secondary switches through adjusting the on-time of the switches. As such, the LLC resonant converter 600 may achieve higher efficiency even if the switching frequency is not equal to the resonant frequency of the resonant tank.

It should further be noted that the operation principle of the switches $Q_A$ and $Q_B$ described above is merely an example. There may be many variations, alternatives and modifications. For example, instead of turning on $Q_B$ only and relying on the body diode of $Q_A$, both $Q_A$ and $Q_B$ may be turned on at t0 to further reduce the conduction losses from the body diodes. If this implementation is selected, a zero current detector circuit may be required to detect the end point of the resetting process of the parallel inductor Lp. In other words, $Q_A$ should be turned off once the parallel inductor Lp is fully reset. One skilled in the art will recognize that the turned off $Q_A$ helps to reduce the conduction losses during the interval from t2 to t3.

At the first time t1, Q1 and Q4 are turned on through a zero voltage transition. As shown in FIG. 6B, the drain-to-source voltage of Q4 has already been discharge to zero before Q4 is turned on at t1. After Q1 and Q4 are turned on, energy is delivered from the primary side to the secondary side through the turned on Q5 and Q8.

It should be noted that the resetting process of the parallel inductor Lp may not finish at t1. The input power source Vin resets the auxiliary path current of the parallel inductor Lp through a conductive path formed by the turned on Q1, Q4, the body diode of $Q_A$ and $Q_B$. Once the current flowing through the parallel inductor Lp reaches zero, the body diode of $Q_A$ prevents the auxiliary path current from flowing through the parallel inductor Lp during the interval from t2 to t3.

One advantageous feature of having the back-to-back connected switches (e.g., switches $Q_A$ and $Q_B$) is that the conduction time of the parallel inductor Lp is reduced to a short period (e.g., interval from t0 to t2 or interval from t3 to t6). In some embodiments, the short period is approximately equal to one tenth of the switching period of the LLC resonant converter 600. In alternative embodiments, when the LLC resonant converter 600 operates at a high switching frequency, one tenth of the switching period may be not enough for discharging the capacitances. Depending on design needs and different applications, the short period may be less than 50% of one switching period.

In sum, the short period described above helps to reduce the conduction losses of the parallel inductor Lp. As a result, the efficiency of the LLC resonant converter 600 is further improved.

Another advantageous feature of having the back-to-back connected switches is that two resonant processes of the LLC resonant converter 600 are fully decoupled. The LLC resonant converter 600 comprises a first resonant process due to the resonance between the resonant inductor Lr and the resonant capacitor Cr. The LLC resonant converter further comprises a second resonant process due to the resonance between the parallel inductor Lp and the drain-to-source capacitances of the primary side switches.

The resonant current of the first resonant process conducts through the resonant inductor Lr and the resonant capacitor Cr during the entire switching period. On the other hand, the resonant current of the second resonant process conducts through the parallel inductor Lp only when the switch (e.g., $Q_A$ and $Q_B$) is turned on. As such, the first resonant process is decoupled from the second resonant process. Such decoupled resonant processes help to simplify the design of the LLC resonant converter 600.

During the time interval from t1 to t2, as shown in FIG. 6B, the current flowing through the parallel inductor Lp is approximately equal to the primary side current Ip. Therefore, the current flowing through the resonant inductor and the resonant capacitor is approximately equal to zero. Such a zero current crossing point of the resonant tank may help to achieve zero current switching of the secondary side switches (e.g., Q8).

At t1, Q1 and Q4 are turned on through zero voltage switching and Q5 and Q8 are turned on through zero current switching. At t3, the controller (not shown) turns on $Q_A$ to prepare another zero voltage transition. Through a conductive path formed by Q1, $Q_A$, the body diode of $Q_B$ and Q4, the input voltage source Vin starts to charge the parallel inductor Lp as shown in FIG. 6B.

At t4, both Q1 and Q4 are turned off. Q2 and Q3 are not turned on immediately. Instead, there may be a dead time, which starts from t4 and stops at t5. During the dead time, the drain-to-source voltage of Q4 (e.g., $V_{SW\_P}$ shown in FIG. 6B) is charged to a voltage level approximately equal to Vin by the current flowing through the parallel inductor Lp. Likewise, the drain-to-source voltage of Q2 is discharged to zero. As a result, at t5, both Q2 and Q3 may achieve zero voltage switching.

During the time interval from t5 to t7, Q2 and Q3 are turned on. Energy is delivered from the primary side to the secondary side through the turned on Q6 and Q7. The resetting process of the parallel inductor Lp may finish at t6. As described above, the body diode of $Q_B$ prevents the current from flowing into the parallel inductor Lp.

As described above, one advantageous feature of having a short conduction time of the switch (e.g., $Q_A$ or $Q_B$) is the primary side switches may achieve zero voltage switching and the second side switches may achieve zero current switching while the conduction losses from the parallel inductor Lp may be further reduced. As a result, the efficiency of the LLC resonant converter 600 may be improved.

Figure 7A:
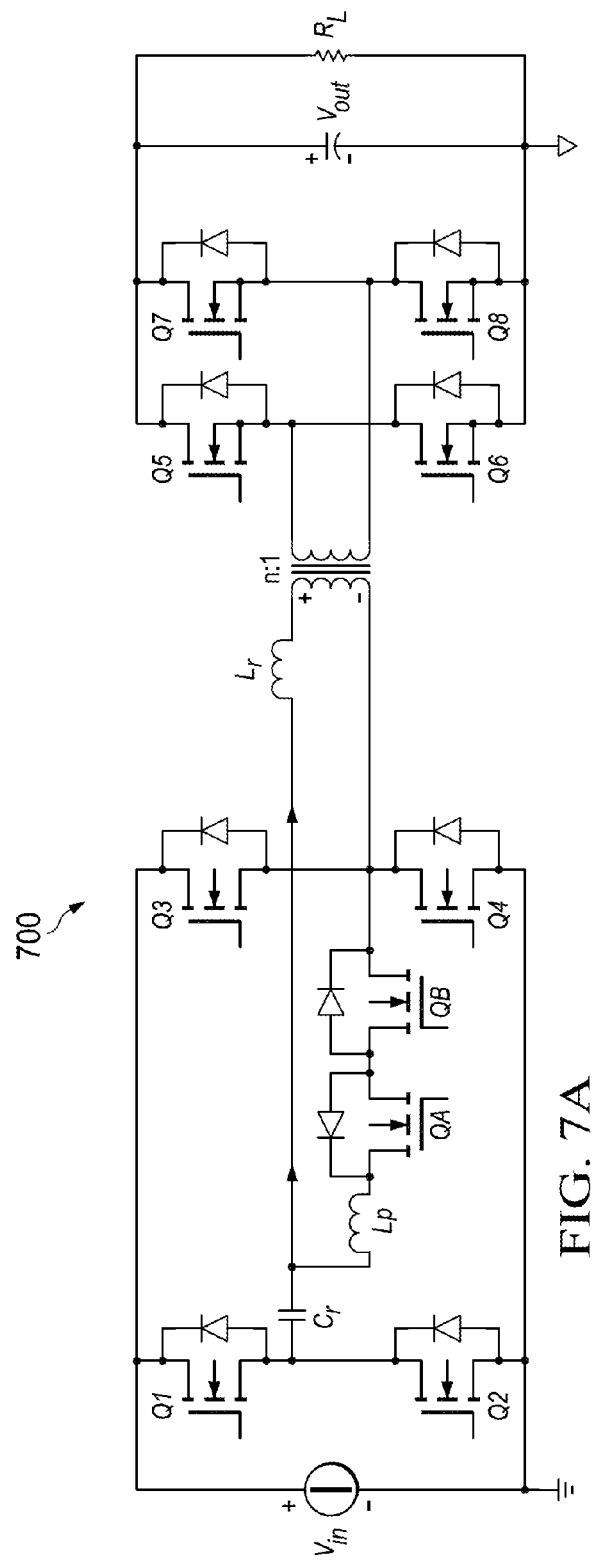
FIG. 7A and FIG. 7B illustrate another schematic diagram of the LLC resonant converter shown in FIG. 2 in accordance with various embodiments of the present disclosure.
Figure 7B:
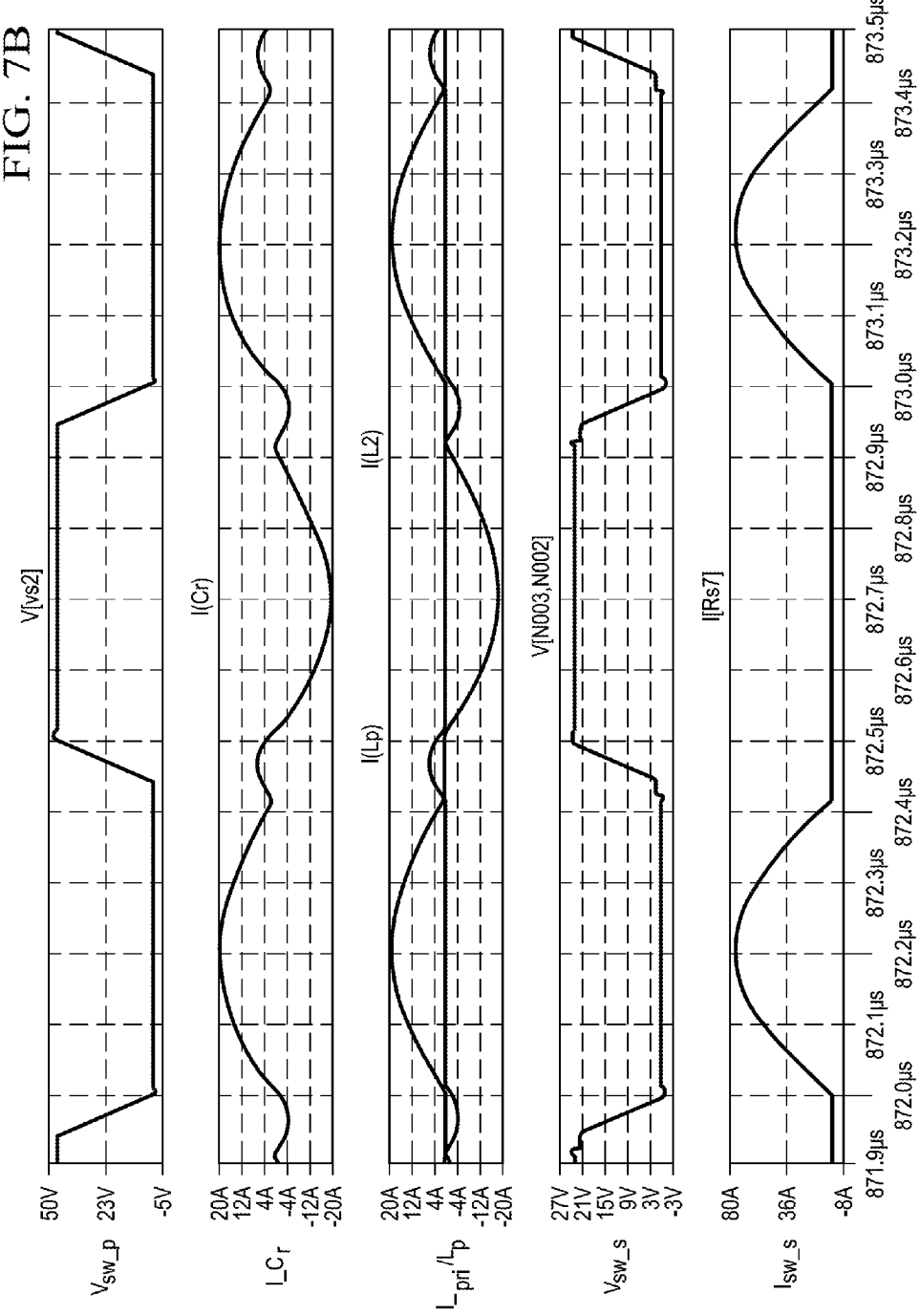

FIG. 7A and FIG. 7B illustrate a schematic diagram of another LLC resonant converter in accordance with various embodiments of the present disclosure. The LLC resonant converter 700 is similar to the LLC resonant converter 500 shown in FIG. 5 except that the parallel inductor Lp is placed between the resonant inductor Lr and the resonant capacitor Cr. In other words, Lp is coupled to a common node of the resonant inductor Lr and the resonant capacitor Cr. The operation principle of the LLC resonant converter 700 is similar to that of the resonant converter 600 shown in FIG. 6A, and hence is not discussed herein to avoid unnecessary repetition.

Figure 8A:
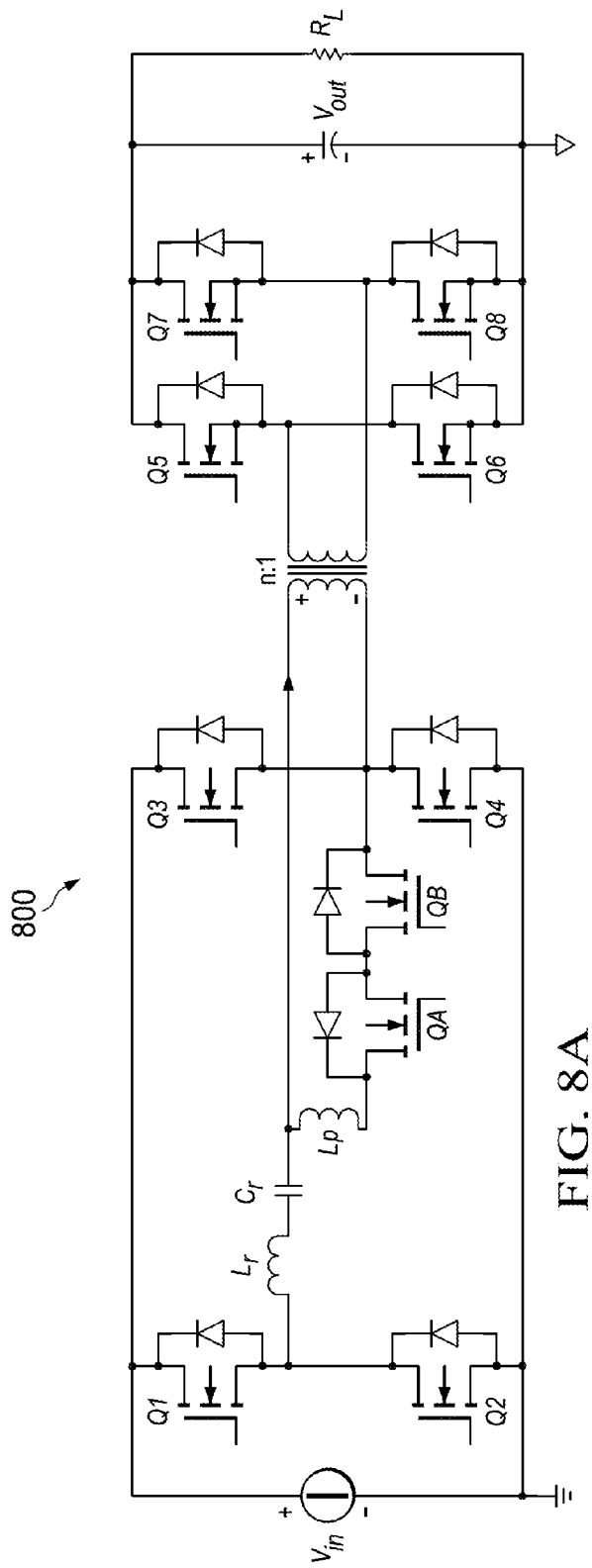
FIG. 8A and FIG. 8B illustrate yet another schematic diagram of the LLC resonant converter shown in FIG. 2 in accordance with various embodiments of the present disclosure.
Figure 8B:
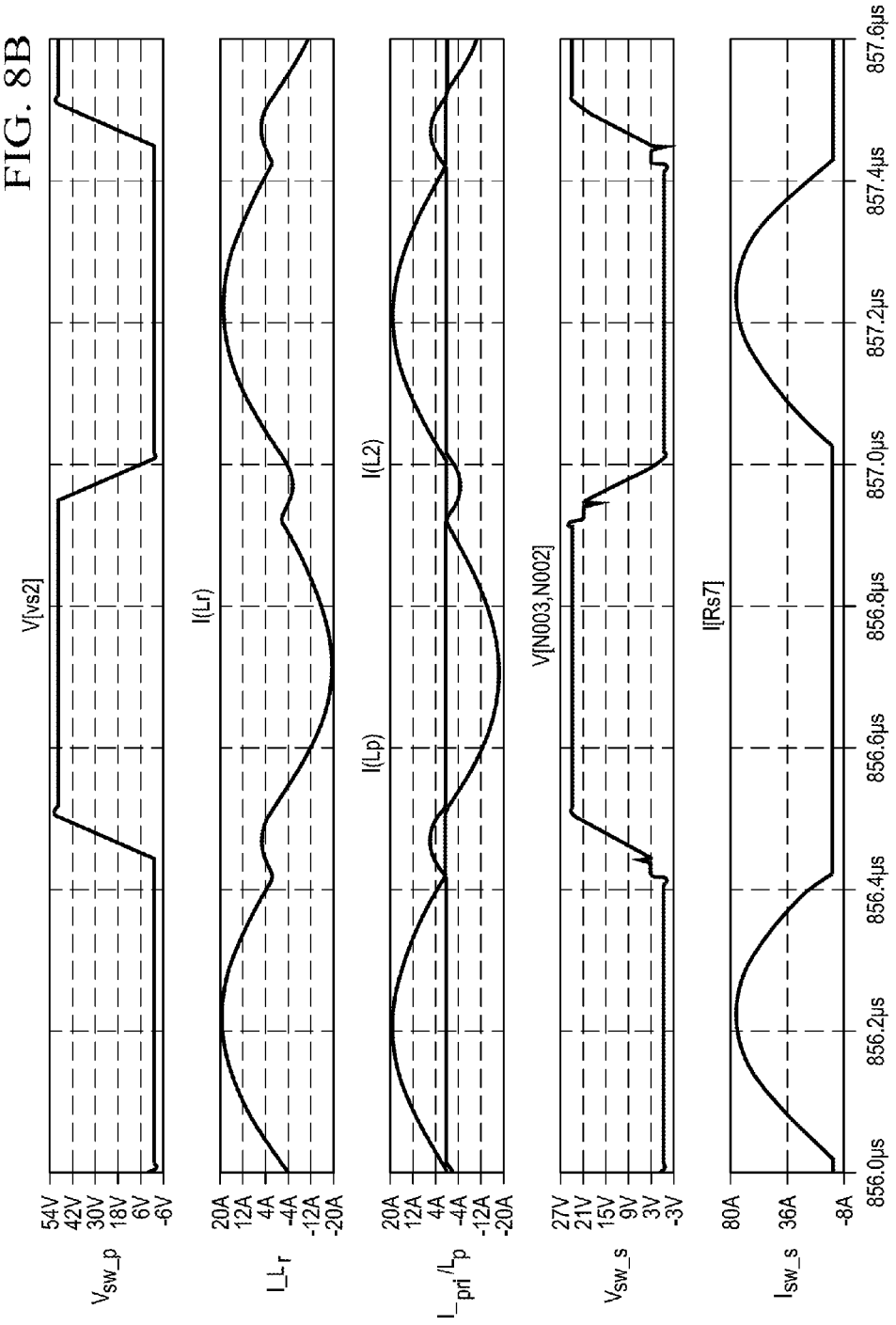

FIG. 8A and FIG. 8B illustrate a schematic diagram of yet another LLC resonant converter in accordance with various embodiments of the present disclosure. The LLC resonant converter 800 is similar to the LLC resonant converter 500 shown in FIG. 5 except that the parallel inductor Lp is connected in parallel with the magnetizing inductance Lm. The operation principle of the LLC resonant converter 800 is similar to that of the resonant converter 600 shown in FIG. 6A, and hence is not discussed herein to avoid unnecessary repetition.

Figure 9A:
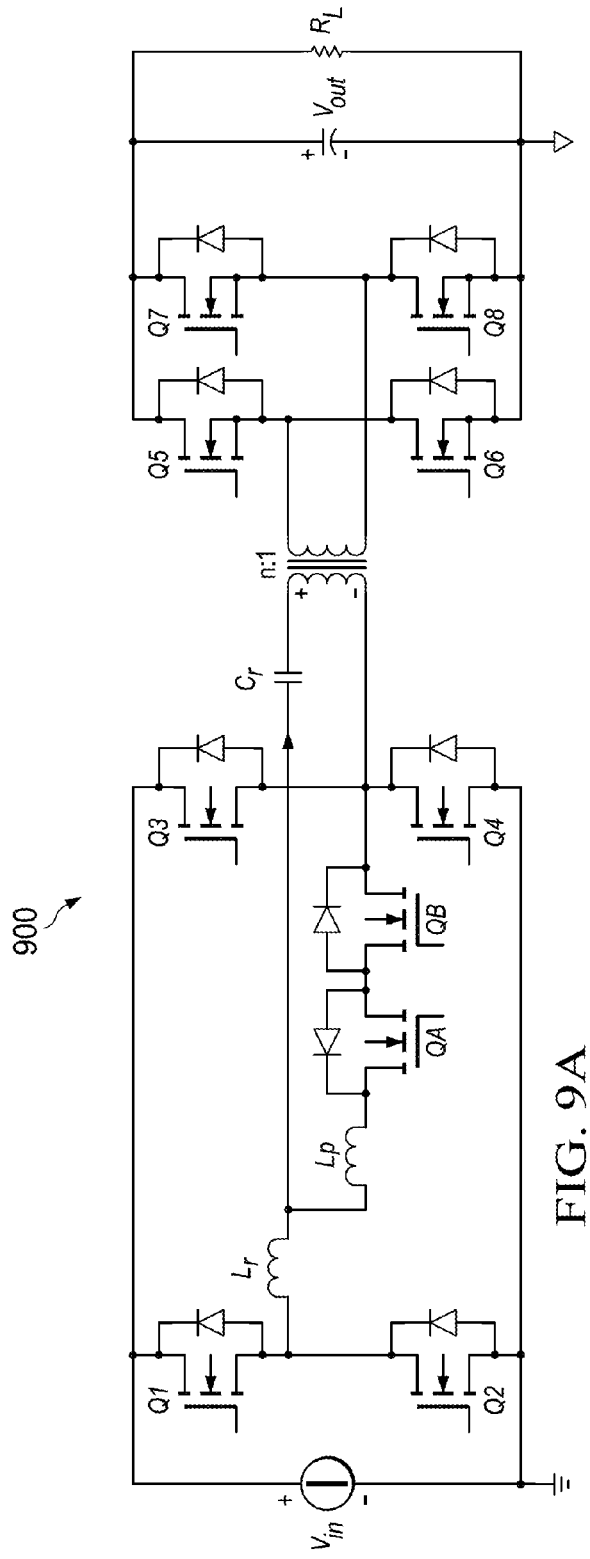
FIG. 9A and FIG. 9B illustrate yet another schematic diagram of the LLC resonant converter shown in FIG. 2 in accordance with various embodiments of the present disclosure.
Figure 9B:
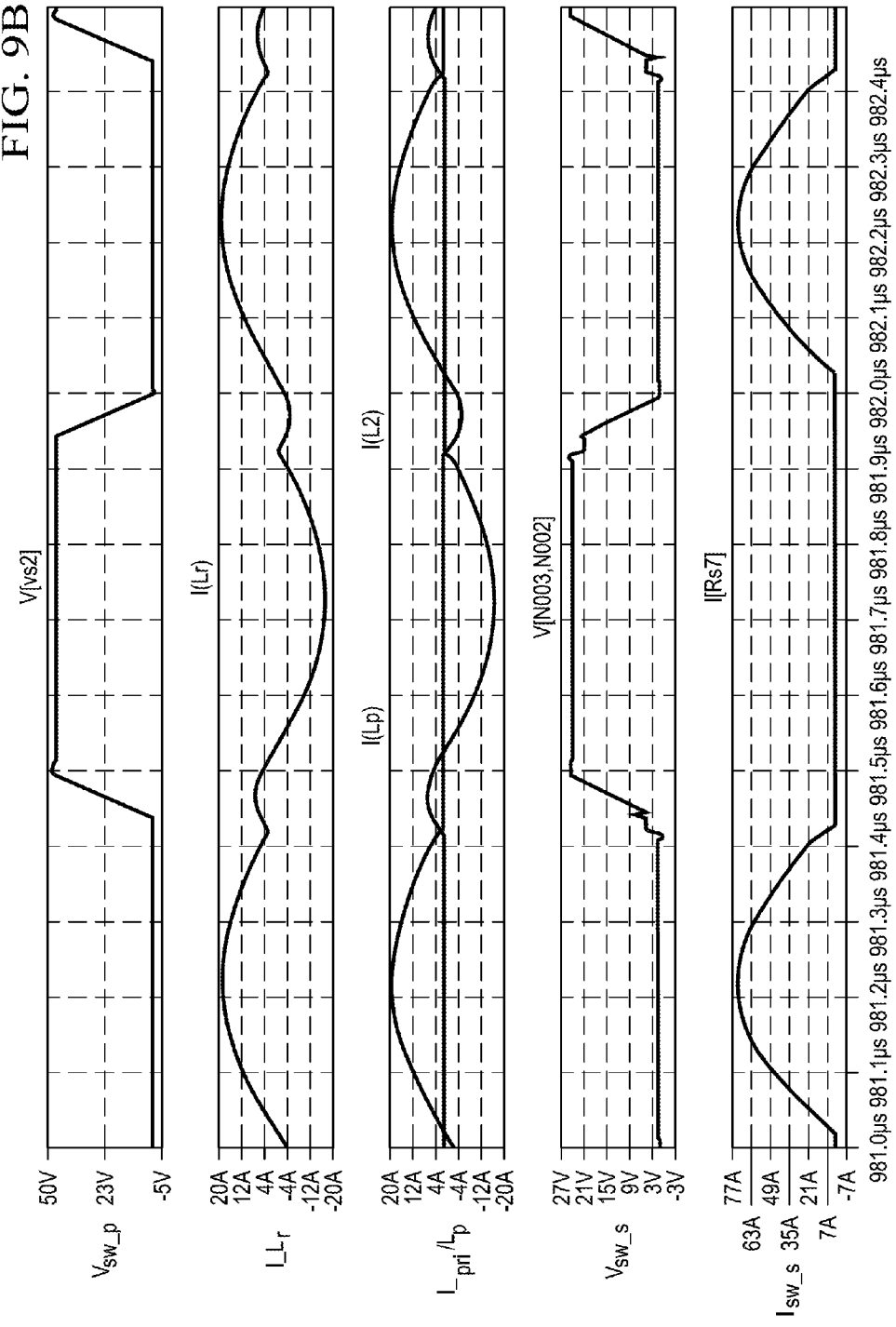

FIG. 9A and FIG. 9B illustrate a schematic diagram of yet another LLC resonant converter in accordance with various embodiments of the present disclosure. The LLC resonant converter 900 is similar to the LLC resonant converter 700 shown in FIG. 7A except that the locations of the resonant capacitor Cr and the resonant inductor Lr are swapped. The operation principle of the LLC resonant converter 900 is similar to that of the LLC resonant converter 700, and hence is not discussed again.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a series resonant inductor coupled to a switching network and a transformer;
a series resonant capacitor coupled to the switching network and the transformer;
a first parallel inductor implemented as a magnetizing inductance of the transformer;
a second parallel inductor implemented as a separate inductor, wherein a first inductance of the first parallel inductor is greater than a second inductance of the second parallel inductor; and
a switch connected in series with the second parallel inductor, wherein a terminal of the switch is directly connected to a terminal of the second parallel inductor, and wherein a first terminal of the second parallel inductor and the first parallel inductor are separated by a resonant element, and a second terminal of the second parallel inductor and the first parallel inductor are separated by the switch.

2. The apparatus of claim 1, wherein:
the first inductance is at least ten times greater than the second inductance.

3. The apparatus of claim 1, wherein:
the switch, the second parallel inductor and drain-to-source capacitances of the switching network form an auxiliary resonant tank; and
the series resonant inductor and the series resonant capacitor form a main resonant tank.

4. The apparatus of claim 3, wherein:
the series resonant inductor and the series resonant capacitor are connected in series and coupled between a first output terminal of the switching network and a first terminal of a primary side winding of the transformer; and
the second parallel inductor and the switch are connected in series to form a series inductor-switch circuit coupled between the first output terminal of the switching network and a second output terminal of the switching network.

5. The apparatus of claim 3, wherein:
the series resonant inductor and the series resonant capacitor are connected in series and coupled between a first output terminal of the switching network and a first terminal of a primary side winding of the transformer; and
the second parallel inductor and the switch are connected in series to form a series inductor-switch circuit coupled between a common node of the series resonant inductor and the series resonant capacitor, and a second output terminal of the switching network.

6. The apparatus of claim 1, wherein:
the switch is formed by two back-to-back connected switching elements.

7. The apparatus of claim 1, wherein:
the switch is so controlled that the switch is turned on during a short period prior to a zero voltage transition.

8. The apparatus of claim 7, wherein:
the short period is less than 50% of a switching period of the switching network.

9. A system comprising:
an input power source;
a switching network comprising:
a first pair of switches coupled between two terminals of the input power source; and
a second pair of switches coupled between the two terminals of the input power source;
a resonant tank connected between the switching network and a primary side of a transformer, wherein the resonant tank comprises:
a resonant inductor coupled to the switching network and the transformer;
a resonant capacitor coupled to the switching network and the transformer;
a first parallel inductor implemented as a magnetizing inductance of the transformer;
a second parallel inductor implemented as a separate inductor, wherein a first inductance of the first parallel inductor is greater than a second inductance of the second parallel inductor; and
a switch connected in series with the second parallel inductor, wherein a first terminal of the second parallel inductor and the first parallel inductor are separated by a resonant element, and a second terminal of the second parallel inductor and the first parallel inductor are separated by the switch;
a rectifier coupled to a secondary side of the transformer; and
an output filter coupled to the rectifier.

10. The system of claim 9, wherein the resonant tank comprises:
the resonant inductor connected in series with the resonant capacitor and coupled between a first common node of the first pair of switches and a first terminal of the primary side of the transformer; and
the second parallel inductor connected in series with the switch to form an inductor-switch circuit coupled between the first common node and a second common node of the second pair of switches.

11. The system of claim 9, wherein the resonant tank comprises:

the resonant inductor connected in series with the resonant capacitor and coupled between a first common node of the first pair of switches and a first terminal of the primary side of the transformer; and the second parallel inductor connected in series with the switch to form an inductor-switch circuit coupled between a common node of the resonant inductor and the resonant capacitor, and a second common node of the second pair of switches.

12. The system of claim 9, wherein:
the transformer is a center-tapped transformer; and
the rectifier is a synchronous rectifier.

13. The system of claim 9, wherein:
the transformer is a non center-tapped transformer; and
the rectifier is a full-wave rectifier.

14. A method comprising:
providing a resonant tank coupled between a switching network comprising a first switch, a second and a transformer, wherein the resonant tank comprises:
  a series inductor;
  a series capacitor connected in series with the series inductor; and
  a parallel inductor connected in series with a switch, wherein a magnetizing inductance of the transformer is greater than an inductance of the parallel inductor and a current flowing through the parallel inductor is equal to a current flowing through the switch, and wherein a first terminal of the parallel inductor and the transformer are separated by a resonant tank element, and a second terminal of the parallel inductor and the transformer are separated by the switch;

configuring the switching network to operate at a switching frequency approximately equal to a resonant frequency of the resonant tank;

prior to a zero voltage transition, during a dead time turning on the switch; and after the zero voltage transition, turning off the switch.

15. The method of claim 14, further comprising:
coupling a switching network to a dc input power source;
coupling a primary side of a converter and a secondary side of the converter through a transformer providing isolation between the primary side and the secondary side of the converter;
coupling a rectifier to the secondary side; and
coupling an output filter to the rectifier.

16. The method of claim 14, wherein:
the switch is formed by two back-to-back connected metal oxide semiconductor transistors.

17. The method of claim 14, wherein:
the dead time is approximately equal to one tenth of a switching period of the switching network.

18. The method of claim 14, wherein:
the magnetizing inductance is at least ten times greater than the inductance of the parallel inductor.

\* \* \* \* \*